United States Patent
Brown (10) Patent No.: US 7,404,647 B1
(45) Date of Patent: Jul. 29, 2008

(54) METHOD FOR OPTIMAL MATERIAL SELECTION AND PROCESSING FOR DYNAMIC MIRROR APPLICATIONS

(75) Inventor: David C. Brown, Northborough, MA (US)

(73) Assignee: GSI Group Corporation, Bedford, MA (US)

( * ) Notice: Subject to any disclaimer, the term of this patent is extended or adjusted under 35 U.S.C. 154(b) by 305 days.

(21) Appl. No.: 11/010,101

(22) Filed: Dec. 10, 2004

Related U.S. Application Data (60) Provisional application No. 60/528,912, filed on Dec. 11, 2003.

(51) Int. Cl.
*G02B 5/08* (2006.01)

(52) U.S. Cl. .................. 359/838; 359/900; 156/250

(58) Field of Classification Search .............. 359/838, 359/851, 900; 156/250
See application file for complete search history.

(56) References Cited

U.S. PATENT DOCUMENTS

| | | | |
|---|---|---|---|
| 3,799,680 A * | 3/1974 | Weisner | 356/225 |
| 4,606,750 A * | 8/1986 | Torii et al. | 65/374.13 |
| 5,424,632 A | 6/1995 | Montagu | |
| 5,579,333 A * | 11/1996 | Neil et al. | 372/99 |
| 5,671,193 A | 9/1997 | Kuroda | |
| 5,922,221 A * | 7/1999 | Ui | 219/69.14 |
| 6,275,319 B1 | 8/2001 | Gadhok | |
| 6,661,962 B1 * | 12/2003 | Calvet et al. | 385/137 |
| 6,836,597 B2 | 12/2004 | Chan | |
| 6,984,051 B2 * | 1/2006 | Takino | 359/855 |
| 7,244,034 B1 * | 7/2007 | Karandikar et al. | 359/838 |
| 2004/0017599 A1 | 1/2004 | Yang | |
| 2004/0150830 A1 | 8/2004 | Chan | |

\* cited by examiner

*Primary Examiner*—Ricky D Shafer
(74) *Attorney, Agent, or Firm*—Gauthier & Connors LLP (57) ABSTRACT

A mirror is disclosed for use in motor system. The mirror includes a composite with at least one of silicon carbide, boron, and boron carbide and an alloying agent that increases the electrical conductivity of the composite sufficient for the composite to be processed by electrical discharge machining.

18 Claims, 6 Drawing Sheets

METHOD FOR OPTIMAL MATERIAL SELECTION AND PROCESSING FOR DYNAMIC MIRROR APPLICATIONS

PRIORITY

This application claims priority to U.S. Provisional Patent Application Ser. No. 60/528,912 filed Dec. 11, 2003.

BACKGROUND

The invention generally relates to mirrors, and relates in particular to mirrors and methods of constructing mirrors for use in motor systems such as in limited rotation motor systems and continuous rotation motor systems.

Mirror materials for limited rotation motors (such as galvanometers) have traditionally been chosen from available hard, polished or easily polishable natural materials. For example, mirrors have long been formed of a wide variety of materials, including for example, ice, copper, bronze, obsidian and silver, as well as coated or plated materials such as silver coated glass, mangin coated glass, and rhodium coated electro-formed metals. The use of a coating permits a different material to be used for the structural component of a mirror while the reflective surface is formed of another material (or composite).

For certain applications, however, such as for use with limited rotation motors, conventional coated glass mirrors do not provide sufficient stiffness or low enough density for some applications. Beryllium and silicon carbide are known to be suitable for use as mirror materials in galvanometers, but each suffers from certain drawbacks. Beryllium is generally expensive and difficult to process by grinding and polishing, and further has become disfavored in view of it being a possibly toxic material. Silicon carbide is also generally expensive and difficult to process by grinding and polishing.

There is a need, therefore, for an improved mirror material and method of making an improved mirror for use in limited rotation motor systems.

SUMMARY

The invention provides a mirror for use in a motor system. The mirror includes a composite with at least one of silicon carbide, boron, and boron carbide and an alloying agent that increases the electrical conductivity of the composite sufficient for the composite to be processed by electrical discharge machining. In certain embodiments, the composite may include silicon carbide alloyed with additional silicon. In further embodiments, the invention provides a method of manufacturing a mirror for use in a galvanometer using EDM.

BRIEF DESCRIPTION OF THE ILLUSTRATED EMBODIMENTS

The following detailed description may be further understood with reference to the accompanying drawings in which.

The drawings are shown for illustrative purposes only.

DETAILED DESCRIPTION OF THE ILLUSTRATED EMBODIMENTS

The figure of merit traditionally used in the selection of low mass, high stiffness engineering materials is specific stiffness, defined as modulus of elasticity (E) divided by density (p). This figure of merit is suitable for static applications, in which the moment(s) of inertia are generally acted upon primarily by the acceleration of gravity. In the case of a component such as a mirror mounted to a limited rotation motor shaft however, the accelerations can be and usually are many orders of magnitude higher, and so the moment of inertia of the mirror about the axis of rotation becomes a principle effect in limiting performance of the system. In conflict with this need for low inertia is the requirement for stiffness in the mirror reflecting face so that it remains flat (or continues to conform to some other desired geometry) during acceleration. In addition to the stiffness required to maintain the figure of the mirror, stiffness is required in order that the first resonance of the mirror in any mode be higher than the electrical bandwidth of the servo system that drives and controls the limited rotation motor; otherwise, the gain of the servo will amplify the resonance and the system will lose control. It is desirable that the electrical bandwidth be as high as possible, because the electrical bandwidth limits the speed of the system. In general, a thick structure is stiffer than a thin one, but of course has more material in it, and so has more inertia.

It has been discovered that a new figure of merit, defined as $E/\rho^3$ (bending) or $G/\rho^3$ (torsion) best specifies a mirror material that optimizes the stiffness of a mirror while minimizing the inertia of such a mirror. This figure of merit is referred to herein as dynamic stiffness. Of course, once the material is chosen, then classical empirical methodologies as well as finite element analysis are used to find the best shape for a particular application. The ranking of available mirror substrate materials by dynamic stiffness has allowed the discovery that several previously-overlooked materials are available to replace beryllium.

The table below compares suitable mirror materials based on their figure of merit in the two systems. It will be seen that the older figure of merit, specific stiffness, would leads to an inappropriate assessment of the desirability of Beryllium, Silicon Carbide, Boron, and Boron Carbide (and others) as mirror materials.

| MATERIAL | DYNAMIC STIFFNESS | MERIT INDEX | SPECIFIC STIFFNESS | MERIT INDEX | CORRECT RANK |
|---|---|---|---|---|---|
| Bare beryllium | 5.05 E 10 | 1.0 | 3.39 E 8 | 1.0 | 1 |
| Nickeled beryllium | 4.44 E 10 | 0.88 | 3.26 E 8 | 0.66 | 2 |
| Boron | 4.07 E 10 | 0.805 | 4.00 E 8 | 1.181 | 3 |
| Boron Carbide | 2.81 E 10 | 0.555 | 3.57 E 8 | 1.054 | 4 |
| Diamond | 2.44 E 10 | 0.483 | 5.03 E 8 | 1.484 | 5 |
| AlBeMet | 2.15 E 10 | 0.425 | 1.91 E 8 | 0.563 | 6 |
| Silicon Carbide | 1.28 E 10 | 0.252 | 2.46 E 8 | 0.726 | 7 |
| Silicon | 8.90 E 10 | 0.176 | 4.05 E 7 | 0.175 | 8 |
| Magnesium | 8.84 E 10 | 0.175 | 4.05 E 7 | 0.120 | 9 |
| Quartz (glass) | 6.99 E 10 | 0.138 | 5.86 E 7 | 0.173 | 10 |

Beryllium is a powder metallurgy product, and as such the bulk material contains pores that appear on the surface as pits. At visible wavelengths, these pits cause scatter, and must be covered with an intermediate coating, usually nickel. The effect on inertia of the nickel plating depends on the size and shape of the mirror, since the plating thickness is constant. These numbers are close to minimum-effect for mirrors in the 10-15 mm aperture range with shapes optimized for the stiffness/inertia ratio. It will be seen from inspection of the table that beryllium has the highest rank in specific stiffness terms, followed by the practical alternative, nickel plated beryllium.

Twin goals for a galvo mirror design of a given aperture are maximum first resonant frequency and minimum inertia. That materials can be ranked according to their ability to achieve these goals by $$\frac{G}{\rho^3}$$

is shown.

The formula for the torsional resonant frequency of a slender cylinder clamped at one end is:

$$\omega = \frac{\pi}{4n-2} \sqrt{\frac{G}{\rho h^2}} \quad (1)$$

where h=height of cylinder; G=torsion stress modulus; ρ=material density; and n=vibrational mode number. (For unclamped cylinders the coefficient in (1) is π/n). More generally for n=1, $$\omega = \frac{\pi}{2} \sqrt{\frac{GK}{hJ}} \quad (2)$$

where K is a factor dependent on cross-section; it is equal to the polar moment of inertia for circular cross-section (K=πr⁴/2 and thus (2) reduces to (1) since J=ρπr⁴h/2), and is less for other sections.

Assume for simplicity that the mirror is a rectangular slab with the following dimensions: h=height of mirror along axis of rotation, w=width of mirror, and T=thickness of mirror. For a rectangular cross-section, the approximate value for K is:

$$K \cong wT^3 \left( \frac{1}{3} - .21 \frac{T}{w} \left( 1 - \frac{(T/w)^4}{12} \right) \right) \quad (3)$$

which reduces to $$K \cong \frac{wT^3}{3} \quad (4)$$

assuming that w>>T. Mirror inertia is given by $$J = \frac{M}{12}(w^2 + T^2) = \frac{\rho whT}{12}(w^2 + T^2) \cong \frac{\rho w^3 hT}{12} \quad (5)$$

so that $$T \cong \frac{12J}{\rho w^3 h} \quad (6)$$

for w>>T. Substituting (6) into (4) into (2), $$\omega = 24 \frac{J}{h^2 w^4} \sqrt{\frac{G}{\rho^3}} \quad (7)$$

Thus, for a given aperture (h & w) and inertia (J), G/ρ³ determines the first torsional resonance ω. A similar derivation for bending modes gives an analogous result in E/ρ³, where E is Young's tension stress modulus and is simply related to G by $$G = \frac{E}{2(1+\mu)} \quad (8)$$

where μ is Poisson's ratio which differs by material. Substituting (5) into (7) yields $$\omega \cong 2 \frac{T}{hw} \sqrt{\frac{G}{\rho}} \quad (9)$$

consistent with (1) above.

Many of the otherwise desirable materials listed above by dynamic stiffness are very difficult materials to form or machine into complex shapes, leading to great expense in the final product. As an example, metallic beryllium is a formed by a complex process from the ore beryl, in which the purified small particles of the metal are finally sintered into a semi-solid ingot. In some cases, large parts can be hot isostatically pressed into near-net shape from the purified particulates when the number of parts required justifies the tooling expense. This is not practical for the small sizes typically used for dynamic mirrors. Beryllium is a brittle metal that chips and/or cracks easily during conventional machining. The layer remaining near the surface after machining is usually so permeated by stress cracking that it must be removed by etching before further processing or use.

Fortunately, beryllium has a relatively high electrical conductivity, and so it has been found that it machines easily by means of spark erosion, so-called EDM (electrical discharge machining). In accordance with an embodiment, the invention provides a mirror blank preparation process in which a block of beryllium or other material of, for example, 6 inches long and 2 inches in cross-section, is profiled longitudinally by means of a multi-axis wire EDM machine to form the plan view of the mirror, and then sectioned transversely to produce 60 to 100 blanks of the proper thickness. Any shaping of the back side of the mirror to reduce it's inertia is also done as a tertiary operation with the same wire EDM machine. The diameter of the wire, and thus the width of the cut is on the order of a few thousandths of an inch, so very little material is wasted making the cut, and several nested parts can be cut out of the same block at the same time if desired. Thus pairs of galvanometer mirrors, normally supplied in two different profiles as X and Y mirrors for use in devices to scan a plane, can easily be produced together. This process may be employed to make accurate, stress-free cuts in beryllium at high speed, and is thus the preferred method for making small dynamic mirror blanks economically.

Of the other most desirable materials, diamond is sufficiently electrically conductive to be cut by EDM. However, boron, boron carbide, and silicon carbide are not, and are hard, brittle materials so that they must be machined using various forms of the grinding and polishing processes already common in the art. These processes are extremely time consuming and costly. Other processes, such as that of machining silicon carbide in the green or un-vitrified state and firing it later, or converting graphite to silicon carbide by reaction with silane in a reaction chamber, or applying a thin layer of silicon carbide on the surface of a substratum, produce less monolithic structures that suffer from thermal deformations in use, difficult-to-polish surfaces, and other defects that make them inferior to the EDM cut-from-the solid process, as well as more expensive to produce.

In accordance with an embodiment, the invention provides a method that preserves the desirable qualities of silicon carbide, boron, and boron carbide while making these materials sufficiently electrically conductive to allow cutting with EDM. This method is the inclusion of a minority alloying agent in the manufacture of the mirror material itself. In the case of silicon carbide, for example, adding a small excess of silicon (e.g., about 10%) to the furnace mix forms a binary alloy that has silicon carbide crystals embedded in a matrix of silicon. In various embodiments, the amount of added conductive material may range a fraction of a percent to a few percent (e.g., less than about 11%). The matrix of silicon provides the necessary electrical conductivity to allow EDM machining, while most of the desirable properties of the parent, such as hardness and dynamic stiffness are preserved. In the case of boron and boron carbide, the addition of silicon and silicon carbide produce the same desired effect. Silicon by itself does not alloy with boron, but the addition of carbon allows a ternary alloy of silicon carbide, boron carbide, boron, and silicon, that is sufficiently electrically conductive to be cut. The exact proportions of the ingredients are chosen to produce the desired compromise between stiffness, surface quality, conductivity, and density as desired for a particular application.

Figure 1:
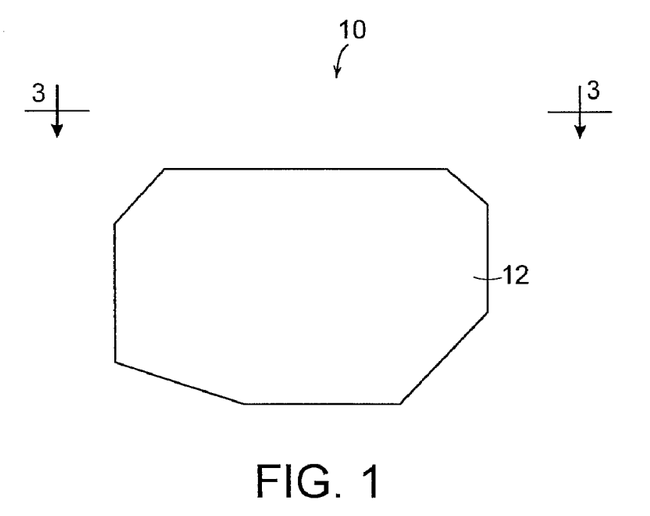
FIG. 1 shows an illustrative diagrammatic front view of a limited rotation motor mirror in accordance with an embodiment of the invention.
Figure 2:
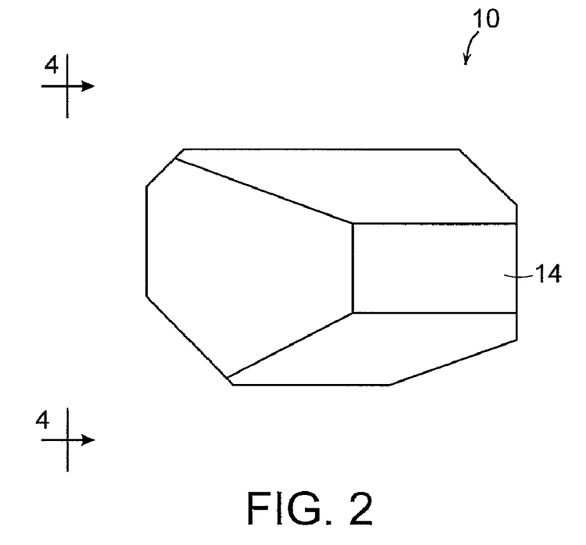
FIG. 2 shows an illustrative diagrammatic back view of the limited rotation motor mirror of FIG. 1.
Figure 3:
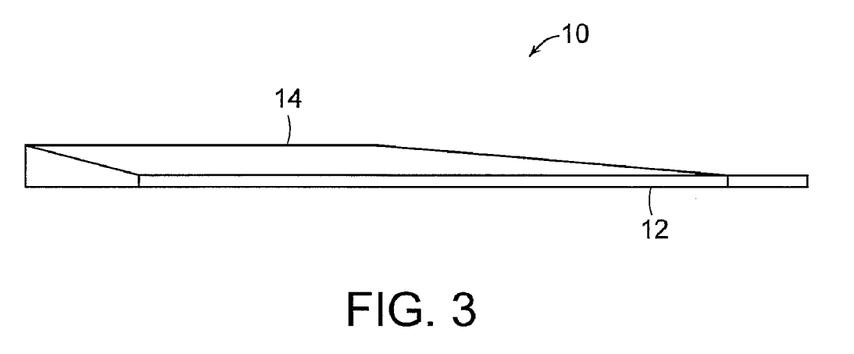
FIG. 3 shows an illustrative diagrammatic top view of the limited rotation motor mirror of FIG. 1 taken along line 3-3 thereof.
Figure 4:
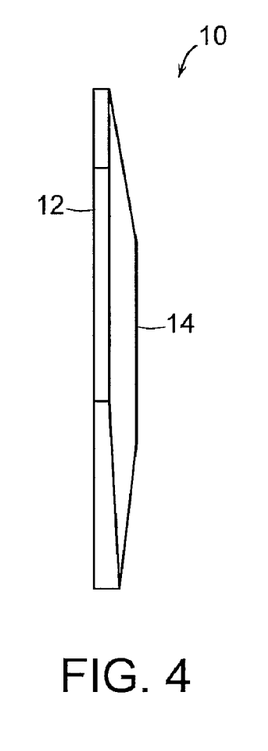
FIG. 4 shows an illustrative diagrammatic side view of the limited rotation motor mirror of FIG. 2 taken along line 4-4 thereof.

As shown in FIG. 1, a mirror 10 may be formed from an alloy of the invention by EDM. The reflective surface 12 may be polished while the back surface 14 (shown in FIG. 2) provides stiffness while maintaining a very thin profile as shown in FIGS. 3 and 4.

Figure 5:
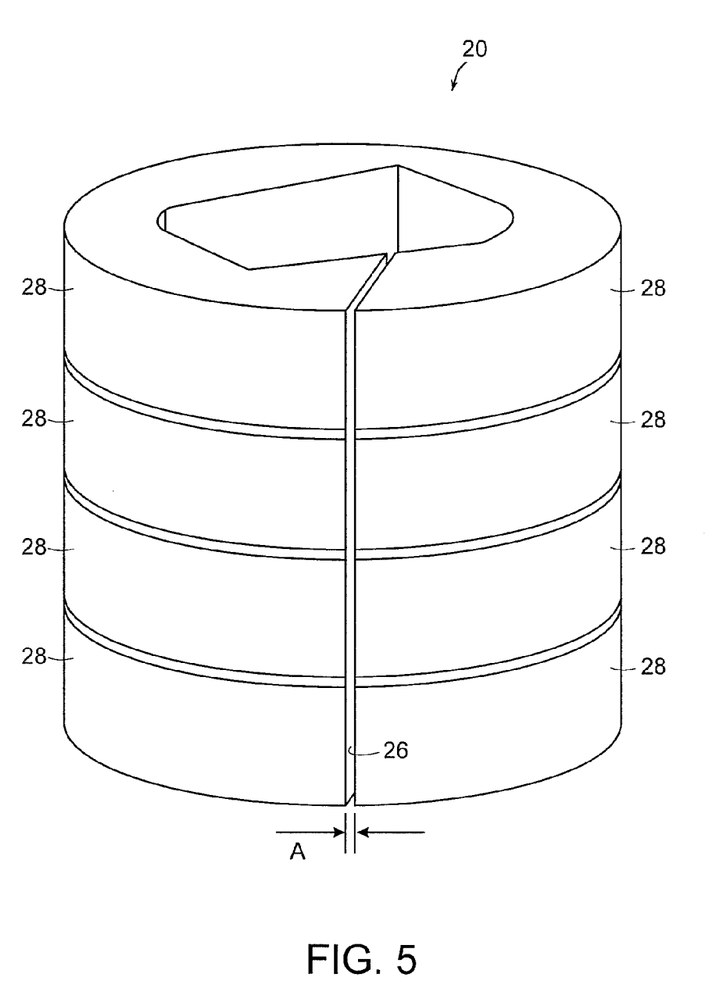
FIG. 5 shows an illustrative diagrammatic isometric side view of a cylindrical block of material from which a mirror block has been cut for making limited rotation motor mirrors in accordance with another embodiment of the invention.
Figure 6:
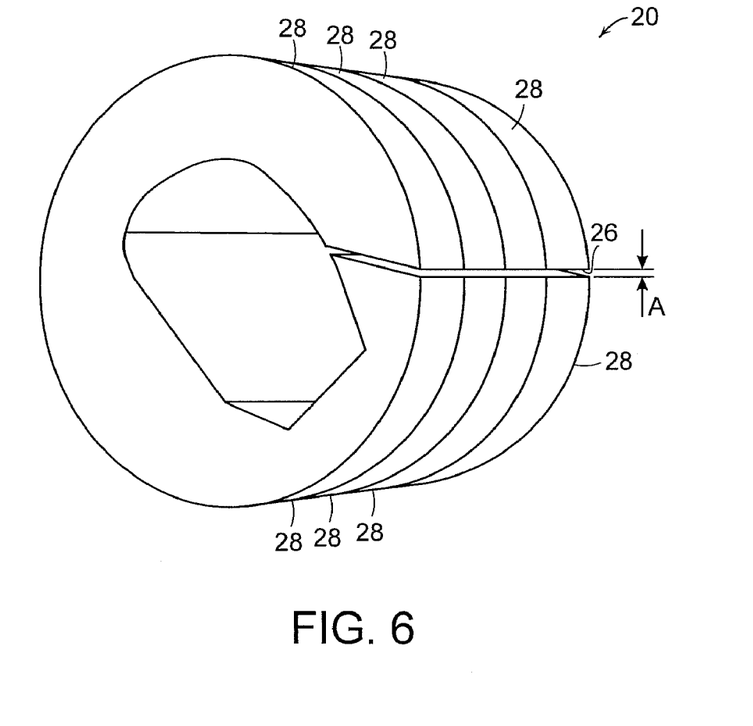
FIG. 6 shows an illustrative diagrammatic isometric top view of the cylindrical block of FIG. 5.
Figure 7:
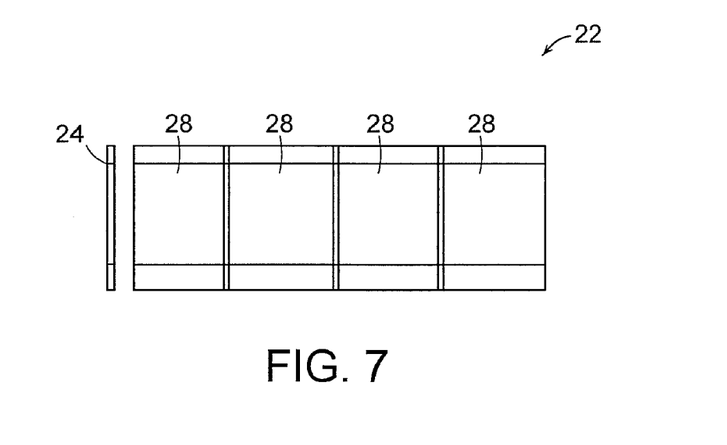
FIG. 7 shows an illustrative diagrammatic side view of a mirror having been cut from the mirror block that was cut from the cylindrical bock of FIGS. 5 and 6.

The invention further provides that a plurality of mirrors may be cut from a mirror block wherein EDM is used to cut each mirror from the mirror block. For example, FIGS. 5 and 6 show a cylindrical block 20 from which a mirror block 22 (shown in FIG. 7) has been removed by EDM. The only material that needs to be removed from the block 20 is the width of the cut 26 from the EDM process (shown at A) over the length and distance of the cut. The block 20, therefore, may be profiled (e.g., cut, trimmed or otherwise shaped) into any two or three dimensional shape having straight and/or curved surfaces. As shown in FIG. 7, a mirror 24 may then be cut from the mirror block 22 by EDM to produce a mirror from an alloy of the invention with a minimum amount of machining work and a minimum amount of machining stress being imparted to the alloy.

In certain applications, it may not be practical to produce suitable alloys in large pieces. The invention further provides a method for creating a desired shape from which a mirror block may be cut in accordance with an embodiment by permitting a plurality smaller elements (such as discs as shown at 28) to be bonded together to form the cylindrical block prior cutting the mirror block. The mirrors cut from the block 26 must be cut so as to avoid the interfaces between adjoining discs 28. The procedure may be desired when a larger unitary block of the desired cylindrical block 20 may not be readily or economically available.

For example, the following method may be employed to create a desired rod-like shape of the block of material. First, the alloy is produced by a process akin to sintering in a mold, after the ingredients are thoroughly and uniformly mixed together. The mold shape most useful for the process produces a discoidal part, although other shapes are possible. The resulting disc of alloy, which may for example be limited in the maximum thickness dimension to approximately 0.3 inches, is cemented to another such disc using a conductive cement such as silver containing epoxy so that a stack of discs of the desired length is produced. The exact thickness of the disc is controlled according to the thickness desired in the finished mirror blank so that the conductive joint is removed between cuts, leaving each blank a monolithic piece of alloy. In other words, if the finished blank thickness desired is, for example, 0.15 inches, then the alloy disc is made to a thickness of 0.3 inches plus 1 cut width, and the EDM cuts occur largely in the cement joint and halfway through the disc, producing two parts from one disc. Smaller thickness dimensions in the finished part allow more parts per discs to be produced. The thickness of the disc is calculated so that 1 blank thickness plus 1 cut thickness multiplied by N, the number of parts desired, is equal to the disc thickness, presently limited to a maximum of about 0.3 inches, although thinner discs are easy to produce from the same mold by filling it with less material. Each disc in the stack produces N blanks. This process utilizes essentially all the alloy, with no meaningful waste. The molded shape of the disc could be modified to approximate the outline of the mirror blank, thus reducing even further the amount of alloy wasted if the quantities of a particular blank shape justified the cost of special, as opposed to generalized, alloy disc tooling.

In various embodiments, therefore, the invention provides a method of using $G/\rho^3$ and $E/\rho^3$ in material selection for galvanometer mirrors. Relatively thin discoidal parts may be stacked together using a conductive bonding layer, to produce the desired rod-like preform in a desired length longer than the thickest producible disc. EDM may be used for mirror blank production as described above. Boron, boron carbide, and/or diamond may be used as a dynamic mirror material, and other materials such as silicon and silicon carbide may be used as minority alloying ingredients with the above materials in making optimal dynamic mirror materials which can be machined by EDM.

The silicon carbide employed in accordance with an embodiment is made by a process of reacting a mixture of silicon carbide abrasive grain, carbon, and a binder (which has been isostatically pressed into a cake) with liquid silicon metal. The process minimizes the amount of un-reacted silicon metal in the finished product. Additional silicon metal may be added that remains un-reacted in the finished product in order to increase the electrical conductivity enough to cut the material by means of EDM. The roughly 10% un-reacted silicon metal, however, reduces the mechanical properties of the finished mirror, in particular the dynamic stiffness because the silicon metal has mass, but fails to contribute to the stiffness.

In accordance with an embodiment, the present invention provides that the un-reacted silicon metal may be removed from the finished mirror blank after the EDM process, which requires it, is completed. The result is the formation of a sponge that is essentially silicon carbide and air. This material is no stiffer than the original material, but it is 10% less dense. As a result, the dynamic stiffness is higher by 1.1*3, or 33%. This places the performance of the new silicon carbide sponge material nearly at that of aluminum/beryllium.

The method by which the silicon is removed in accordance with an embodiment is to raise the temperature of the parts to 2355C or above, and allow the silicon to boil away through the pores in the sponge. The melting temperature of silicon carbide is above 2589° C., so the silicon carbide will be entirely unaffected. The boron carbide/silicon carbide/silicon process is the same, with 45% of each of the main constituents and 10% silicon in the final product. Boron carbide melts above 2533C, so the boron carbide is unaffected as well. In accordance with a further embodiment, the un-reacted metal may be removed by a variety of techniques, such as by the use of reagents (e.g., a sodium hydroxide solution), in a solution that reacts with the silicon leaving the silicon carbide unaffected.

Figure 8:
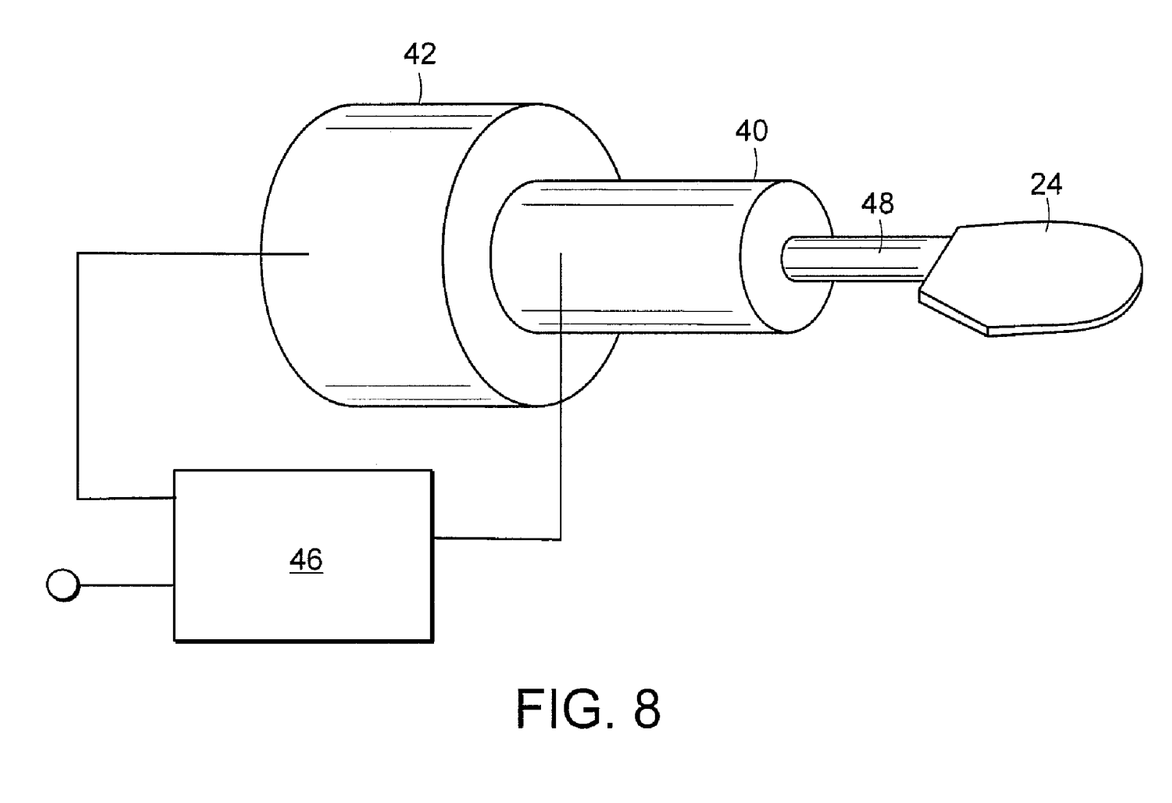
FIG. 8 shows an illustrative diagrammatic isometric view of a mirror cut from the mirror block of FIG. 7 used in a limited rotation motor system in accordance with another embodiment of the invention.

As shown in FIG. 8, a limited rotation motor scanner assembly including a rotor shaft in accordance with an embodiment of the invention may include a scanner motor 40, having a rotatable rotor with an outer sleeve 48 as discussed above, with transducer 42 for monitoring the position of the rotor attached to one end of the rotor and the mirror 24, attached to the output shaft of the scanner motor 40 at an opposite end from the position transducer. Of course, the mirror 24 and the position transducer 42 may each be attached to the rotor at the same end thereof. The system also includes a feedback control system 46 that is coupled to the transducer 42 and the motor 40 as shown to control the speed and/or position of the motor.

Figure 9:
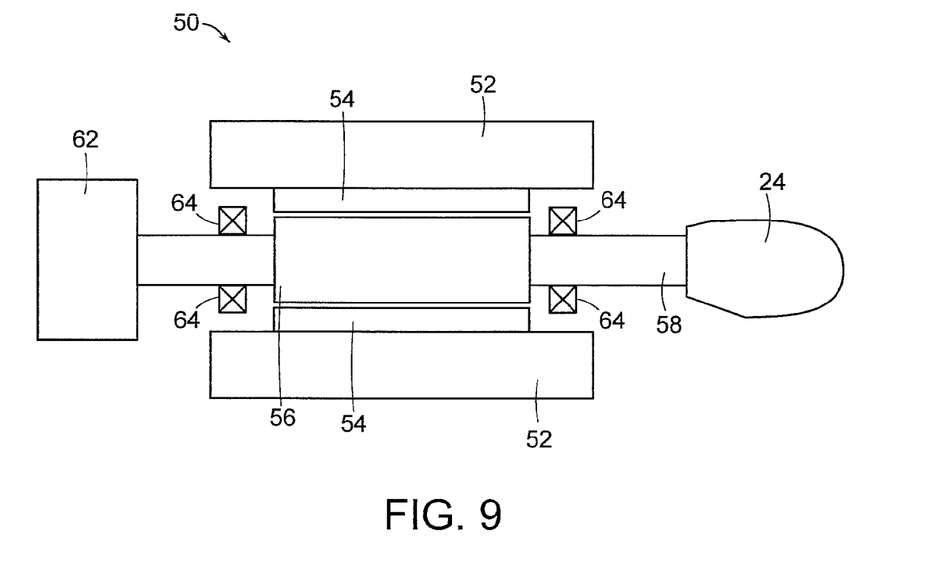
FIGS. 9 and 10 show illustrative diagrammatic side sectional views of further limited rotation motor systems of further embodiments of the invention using a mirror cut from the mirror block of FIG. 7.

In further embodiments, a limited rotation motor assembly 50 including a motor in accordance with an embodiment of the invention includes a backiron 52, stator coils 54 and a magnet 56 that is secured to a shaft 58 as shown in FIG. 9. The shaft 58 is rotatably mounted to a housing structure (not shown) via bearings 64. The mirror 24 is mounted to one end of the shaft 58 while a position transducer 62 is mounted to the other end of the shaft 58.

Figure 10:
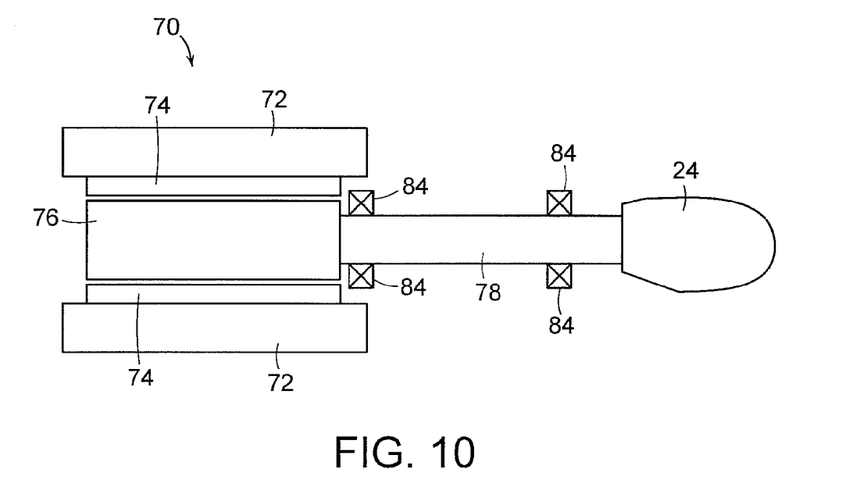

As shown in FIG. 10, a servo controlled continuous rotation motor assembly 70 in accordance with a further embodiment of the invention may include a backiron 72, stator coils 74 and a magnet 76 that is secured to a shaft 78 as discussed above. The mirror 24 is attached to the shaft and the shaft is rotatably secured to a housing structure (not shown) via bearings 84. The galvanometer assembly 100 may further include a position transducer as discussed above. The mirror may be formed of a variety of shapes (e.g., monogons or polygons) where the dynamic distortion of the mirror is inversely proportional to the dynamic stiffness.

Those skilled in the art will appreciate that numerous modifications and variations may be made to the above disclosed embodiments without departing from the spirit and scope of the invention.

What is claimed is:

1. A method of making a mirror for use in a limited rotation motor, said method including the steps of:
    bonding together a plurality of units of a first material to form a block of said first material, wherein said first material includes a composite including at least one of silicon carbide, boron, and boron carbide with an alloying agent that increases an electrical conductivity of the composite;
    profiling said block of first material using electrical discharge machining to form a mirror block; and
    cutting a plurality of mirrors from said mirror block.

2. The method as claimed in claim 1, wherein the amount of alloying agent within the composite is less than about eleven percent.

3. The method as claimed in claim 1, wherein said composite includes silicon carbide alloyed with additional silicon.

4. The method as claimed in claim 1, wherein said composite includes boron alloyed with boron carbide.

5. The method as claimed in claim 1, wherein said method further includes the step of forming said first material, and said step of forming said first material includes the steps of reacting a binder with a liquid silicon metal such that at least about 10% of the silicon metal remain un-reacted in said first material.

6. The method as claimed in claim 5, wherein said un-reacted silicon metal is removed from the first material.

7. The method as claimed in claim 6, wherein said un-reacted silicon metal is removed from the mirror blank by raising the temperature of the first material to at least about 2355° C.

8. A method of making a mirror for use in a galvanometer, said method including the steps of:
    alloying at least one of silicon carbide, boron and boron carbide with an electrically conductive alloy to form a composite material;
    bonding a plurality of units of said composite material together to form a block material; and
    processing the block material using electrical discharge machining to cut at least one mirror from the block material.

9. The method as claimed in claim 8, wherein an amount of alloying agent within the composite material is less than about eleven percent.

10. The method as claimed in claim 8, wherein said composite material includes silicon carbide alloyed with additional silicon.

11. The method as claimed in claim 8, wherein said units are discs.

12. A method of making a mirror for use in a limited rotation motor, said method including the steps of:
    bonding together a plurality of units of a first material to form a block of said first material, wherein said first material includes a composite wherein said composite includes silicon carbide alloyed with additional silicon;

profiling said block of first material using electrical discharge machining to form a mirror block; and cutting a plurality of mirrors from said mirror block.

13. The method as claimed in claim 12, wherein said method further includes the step of forming said first material, and said step of forming said first material includes the steps of reacting a binder with a liquid silicon metal such that at least about 10% of the silicon metal remain un-reacted in said first material.

14. The method as claimed in claim 13, wherein said un-reacted silicon metal is removed from the first material.

15. The method as claimed in claim 14, wherein said un-reacted silicon metal is removed from the mirror blank by raising the temperature of the first material to at least about 2355° C.

16. A method of making a mirror for use in a limited rotation motor, said method including the steps of:

forming a plurality of units of a first material, wherein each unit of the first material is formed by reacting a binder with a liquid silicon metal such that at least about 10% of the silicon metal remain un-reacted in the first material;

bonding together the plurality of units of the first material to form a block of said first material;

profiling said block of first material using electrical discharge machining to form a mirror block; and cutting a plurality of mirrors from said mirror block.

17. The method as claimed in claim 16, wherein said un-reacted silicon metal is removed from the first material.

18. The method as claimed in claim 17, wherein said un-reacted silicon metal is removed from the mirror blank by raising the temperature of the first material to at least about 2355° C.

* * * * *